(12) United States Patent
Hively

(10) Patent No.: US 7,979,372 B2
(45) Date of Patent: Jul. 12, 2011

(54) METHOD AND SYSTEM FOR KNOWLEDGE DISCOVERY USING NON-LINEAR STATISTICAL ANALYSIS AND A 1ST AND 2ND TIER COMPUTER PROGRAM

(75) Inventor: Lee M. Hively, Philadelphia, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 767 days.

(21) Appl. No.: 12/055,515

(22) Filed: Mar. 26, 2008

(65) Prior Publication Data

US 2009/0150323 A1    Jun. 11, 2009

Related U.S. Application Data

(60) Provisional application No. 60/921,014, filed on Mar. 30, 2007.

(51) Int. Cl.
*G06F 17/00*    (2006.01)

(52) U.S. Cl. .......................................................... 706/45

(58) Field of Classification Search ........ 703/2; 702/34, 702/35, 41, 42, 56; 700/44
See application file for complete search history.

(56) References Cited

U.S. PATENT DOCUMENTS

| | | | |
|---|---|---|---|
| 5,197,018 A * | 3/1993 | Oh ................................ | 700/175 |
| 5,626,145 A | 5/1997 | Clapp et al. | |
| 5,743,860 A | 4/1998 | Hively et al. | |
| 5,815,413 A | 9/1998 | Hively et al. | |
| 5,857,978 A | 1/1999 | Hively et al. | |
| 6,460,012 B1 | 10/2002 | Welch et al. | |
| 6,484,132 B1 | 11/2002 | Hively et al. | |
| 6,496,782 B1 * | 12/2002 | Claus et al. .................... | 702/40 |
| 7,023,205 B1 * | 4/2006 | Krupp ........................... | 324/239 |
| 7,139,677 B2 | 11/2006 | Hively | |
| 7,184,983 B2 | 2/2007 | Corby et al. | |
| 7,209,861 B2 | 4/2007 | Hively | |
| 7,322,250 B1 * | 1/2008 | Discenzo ....................... | 73/800 |
| 7,689,394 B2 * | 3/2010 | Furem et al. ................... | 703/8 |
| 2004/0030524 A1 * | 2/2004 | Jarrell et al. .................. | 702/113 |
| 2006/0122798 A1 * | 6/2006 | Teolis et al. ................... | 702/66 |
| 2006/0181427 A1 * | 8/2006 | Bouse et al. ................... | 340/657 |
| 2006/0272861 A1 * | 12/2006 | Hutchinson .................... | 175/50 |
| 2007/0113692 A1 * | 5/2007 | Yasukawa et al. ........... | 73/865.9 |

OTHER PUBLICATIONS

Yeshua, Computational Learning Theory and the Human, 2006, columbia, pp. 1-17.*
Oeda et al., Immune Multi Agent Neural Network and Its Application to the Coronary Heart Disease Database, 2004, Springer-Verlag Berlin Heidelberg, pp. 1-9.*
Hawkins, J. and Blakeslee, S., On Intelligence, Time Books, (New York, 2004), pp. 40-175.

* cited by examiner

*Primary Examiner* — David R Vincent
(74) *Attorney, Agent, or Firm* — Boyle Fredrickson, S.C.

(57) ABSTRACT

The invention relates to a method and apparatus for simultaneously processing different sources of test data into informational data and then processing different categories of informational data into knowledge-based data. The knowledge-based data can then be communicated between nodes in a system of multiple computers according to rules for a type of complex, hierarchical computer system modeled on a human brain.

23 Claims, 5 Drawing Sheets

METHOD AND SYSTEM FOR KNOWLEDGE DISCOVERY USING NON-LINEAR STATISTICAL ANALYSIS AND A 1ST AND 2ND TIER COMPUTER PROGRAM

CROSS-REFERENCE TO RELATED APPLICATION

The benefit of priority based on U.S. Provisional Patent Application No. 60/921,014, filed Mar. 30, 2007, is claimed herein.

STATEMENT REGARDING FEDERALLY SPONSORED RESEARCH

This invention was made with United States Government support under Contract No. DE-AC05-00OR22725 between the United States Department of Energy and UT-Battelle, LLC. The United States Government has certain rights in this invention.

TECHNICAL FIELD

The invention relates to methods and apparatus for knowledge discovery, artificial intelligence and learning.

BACKGROUND OF THE INVENTION

The problem to be solved is how to handle large amounts of data in somewhat different categories utilizing fast processing speeds. Current computer architecture relies largely on serial processing of data and is too slow in analyzing large amounts of seemingly dissimilar types of data in order to assist human decision-making in complex decisions in limited time frames. While parallel processing techniques offer some improvement, the present invention relies on a different organization and processing of data than has been seen before.

SUMMARY OF THE INVENTION

The invention relates to a method and apparatus for processing different sources of test data into informational data and then processing different categories of informational data into knowledge-based data.

The method comprises acquiring a plurality of sets of source data for at least two sets of one category of source data for at least one test subject or process. These are inputs to a first-tier computer program which produces a first group of higher-level informational data. Another occurrence of a first-tier computer program receives at least two sets of data for a different category of source data and produces a second group of higher-level informational data. The first and second groups of informational data are inputs to a second-tier computer program that produces knowledge-based data as an output. The knowledge-based data is transmitted from a first knowledge system to a second knowledge system which are related by rules or a complex, hierarchy of the type seen in human thinking.

The knowledge system can be incorporated in one or more computers. The system of multiple knowledge nodes is currently most likely to be practiced in a computer network with a plurality of computers, but might also be practiced on one supercomputer.

The invention also provides a knowledge-based computer system for simultaneously processing different categories of source data into informational data, and then processing different groups of informational data into knowledge-based data. A first computer comprises a memory for storing a plurality of sets of source data within a first category of data for at least one test subject or process. The system further comprises a first occurrence of a first-tier computer program executing on the first computer in the system for processing the sets of source data within the first category to produce a first group of informational data; a second occurrence of a first-tier computer program executing on either the first computer or another computer in the system for processing the sets of source data within a second category to produce a second group of informational data; a second-tier computer program executing on either the first computer or another computer for processing the first and second groups of information to produce knowledge-based data; and network communication devices of a type known in the computer art, which in the invention are used for transmitting at least one of the source data, the informational data and knowledge-based data from the first computer to a second computer having other source data, informational data and knowledge-based data for evaluation with the data from the first computer.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION

Figure 1:
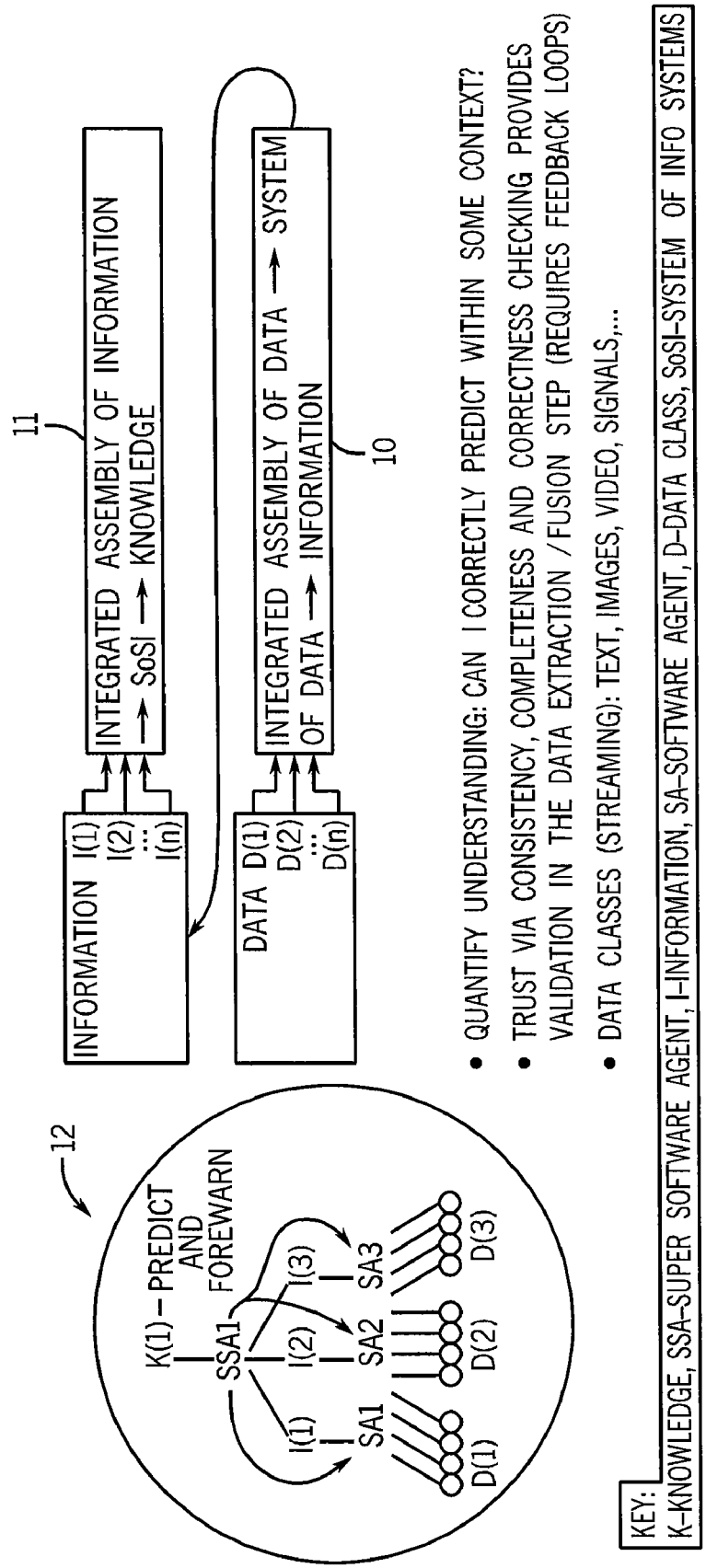
FIG. 1 is block diagram of single processing node of the present invention.

Advanced knowledge discovery involves automated searches for useful patterns in digital data (e.g., real-time capture of vector, raster, text, sound). In 2002, the World Wide Web on networks contained 167 terabytes of freely accessible data, plus another 91,850 terabytes in controlled access, and 440,606 terabytes of email. The data typically include intricate relationships among many people (social and political networks) across multiple time scales (sub-second to decades) and complex geo-spatial features (micron-sized biological agents to >$10^9$ kilometers for earth-asteroid encounters). This processing must provide situational "understanding" that allows decision-makers to act. This capability is presently unavailable in any form, but is essential for real-time, knowledge-age response.

A crucial component of knowledge discovery is "intelligent" processing. The "Chinese room" thought experiment illustrates that intelligence is not manifested behaviorally. Namely, a person with no knowledge of Chinese is given questions in Chinese, along with a detailed rulebook about how to sort and transcribe Chinese characters. After carefully following the rules, this effort yields correct answers to the questions in perfect Chinese. However, the answers do not come from an understanding of the rule-based response to the questions. This example shows that intelligence requires understanding.

The present invention relies on the human brain's superior speed and insight in processing categories of data, such as text, images, audio, and sensory data, simultaneously for real-time situational understanding.

As to the speed required to do this, a person can read these words and understand the message in real-time (one second or less) via neuron-based processing that has a cycle time of about 10 milliseconds, corresponding to no more than 100 neural hops ($10^2$ processing cycles) per second. On the other hand, modern high-performance computers run at trillions of operations per second ($>10^{12}$ operations/second), or $>10^{10}$-fold faster than the brain, yet cannot perform real-time processing of the same data. Consequently, the human brain's ability to process and understand diverse data does not depend on speed, but on a completely different paradigm.

In J. Hawkins and S. Blakeslee, *On Intelligence,* Time Books, (New York, 2004) ISBN 0805074562, the brain's unique superiority is explained as a neocortex providing human intelligence through fast retrieval using a complex, hierarchical memory-based processor, rather than using a von Neumann type of processor. The brain has ~$10^{11}$ neurons, and ~$10^{14}$ connections that correspond to ~8 TB. One essential feature of this new paradigm is an irreducible representation for each item that the brain stores. A second feature is auto-associativity among items (e.g., recall of one line of a song that enables remembering the remainder), because "a memory" is really recall of a sequence of stored items. A third feature is hierarchical processing, which (for example) combines the simplest spoken sounds (phonemes) into words, which are combined into phrases that form sentences, and then concepts. The fourth feature involves feed-forward links in the processing hierarchy to make the appropriate connections among phonemes, words, phrases, sentences, and concepts in the context of previous knowledge. A fourth feature also includes feed-back from higher-to-lower levels in the hierarchy for self-consistent extraction of the knowledge in terms of known words (rather than nonsense words), proper syntax, correct grammar, and situational context. Likewise, image processing extracts (for example) points, lines, polygons, object identification, scene familiarity, and scene changes. Indeed, the same neocortical processing paradigm extracts a hierarchical sequence of patterns for all sensory observations (auditory, somatosensory, etc.). The flexibility and ubiquity of the neocortex's processing approach is further illustrated by blind people, who can be trained to see crude images via discrete touch points on the tongue. "Understanding" under this paradigm is measured by the ability to correctly predict the outcome under similar circumstances, and is the essence of intelligence. Regrettably, Hawkins does not provide any approach for an automated implementation of this new processing paradigm.

The present invention utilizes new definitions for "information" and "knowledge." Informational data as used herein shall mean a "system of data" (not a "data system") in the sense that a system (e.g., data sensors, software, computer hardware) acquires and analyzes source data to provide a novel insight (e.g., forewarning of an epileptic event from time-serial, brain-wave data.) Knowledge, as used herein, shall mean a "system of informational data" (not an "information system") or equivalently a "system of systems of data," meaning that a system of systems (e.g., information sensors, software, computer hardware) acquires and analyzes informational data to provide a novel insight (e.g., patient's response to drug treatment via analyses of brain waves, heart waves, chest sounds).

A "system" as that term is used herein, shall mean a set of interacting or interdependent components that form an integrated whole to perform a specific function. System integration involves relationships among the components, such as "request data from," "acquire data from," "provide data to," "store data from," "analyze data from," and "provide results to." These functions can be accomplished using computer networking and I/O devices of a type known in the art.

An integrated assembly of interacting components is a system 12, so "information" is defined as a system of data 10 as seen in FIG. 1. The right side of FIG. 1 shows this conversion in diagrammatic form. Knowledge-based data K(1) is information in the context of other information, or an integrated assembly of related information elements 11. Then, a knowledge-based is a system of informational data systems (SoIS); this concept is also diagrammed in FIG. 1.

The left side of FIG. 1 shows how, within one knowledge system 12, in which data (D) is converted first to informational data (I). Data classes D(1), D(2) and D(3) are processed by software agent programs SA1, SA2 and SA3, respectively, to produce informational data, I(1), I(2) and I(3). The data D(1), D(2) and D(3) can be acquired through sensors or stored in a memory for access by the software agent programs SA1, SA2 and SA3. The software agent programs SA1, SA2 and SA3 apply operative functions or algorithms to transform source data (D) to informational data (I). While software agent programs are preferred for their mobility in distributed computing systems, other types of computer programs could be employed. Informational data from different sources of data, D(1), D(2) and D(3), are integrated by a super software agent program, SSA1 to become knowledge-based data K(1) such as prognosis of medical patient's condition, given predictive information from monitoring data.

Figure 2:
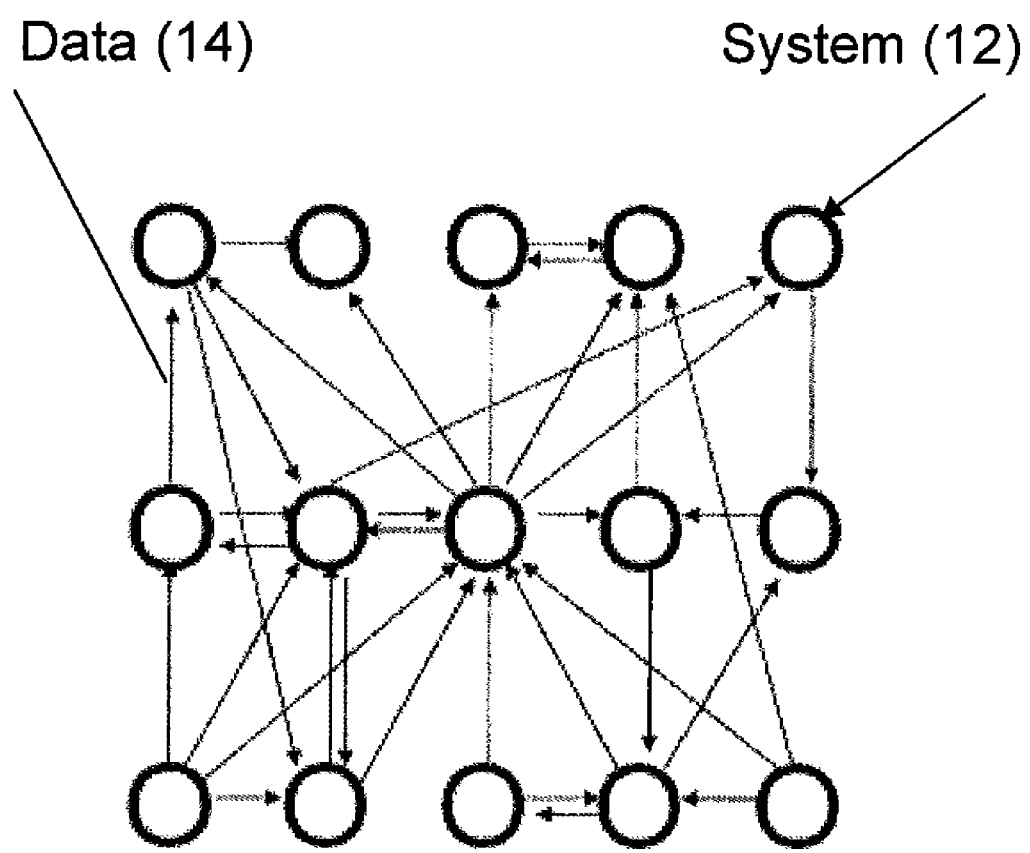
FIG. 2 is a bubble diagram of a group of parallel processing nodes of type seen in FIG. 1.

FIG. 2 illustrates how systems such as the system 12 in FIG. 1 can be organized in a complex hierarchy modeled on the human brain. The systems 12 are nodes in the system and these nodes pass source data, informational data, and knowledge-based data 14 to one another in a hierarchical, networked, non-serial computing environment using network communication devices of a type known in the art. As one of ordinary skill in the art can readily appreciate, this paradigm is radically different from modern high-performance computing environments. Each node 12 represents one of more computers for carrying out the functions shown in FIG. 1.

One example of the present invention would relate the prior work of the inventor herein in the forewarning of critical events through analysis of one or more groups of real time data to Hawkins' paradigm for knowledge discovery. The prior technology processes complex, time-serial measurements, as follows. The method first rejects data of inadequate quality to avoid the garbage-in-garbage-out syndrome. Next, the method removes confounding artifacts (e.g., fundamental sinusoid in electrical data) by a novel filter. The symbol, $x_i$, denotes the artifact-filtered value at time, $t_i$. These data are converted to one of S discrete symbols, $s_i$, via the formula:

$$0 \leq s_i = S(x_i - x_{min})/(x_{max} - x_{min}) \leq S-1. \tag{1}$$

Here, $x_{max}$ and $x_{min}$ are the maximum and minimum values in $x_i$, respectively. If the complex, high-dimensional process dynamics are confined to a bounded, low-dimensional region (called an "attractor"), then the symbolized data can be converted into a discrete phase-space vector, which has the form:

$$y(i) = [s_i, s_{i+\lambda}, \ldots, s_{i+(d-1)\lambda}]. \tag{2}$$

Here, λ is the time delay, and d is the dimension of the vector. The multi-channel form is:

$$y(i)=[s(1)_i, s(1)_{i+\lambda}, \ldots, s(1)_{i+(d-1)\lambda}, \ldots, s(C)_i, s(C)_{i+\lambda}, \ldots, s(C)_{i+(d-1)\lambda}] \quad (3)$$

Here, s(k) denotes symbolized data from the kth channel, $1 \leq k \leq C$. Symbolization divides the multi-channel phase-space into $S^{Cd}$ bins. The number of points that occur in each phase-space bin is determined, thus forming a discrete distribution function (DF) that captures the essence of the process dynamics, in terms of the geometry and visitation frequency on the attractor. The population of the ith bin of the DF, is denoted $Q_i$, for the base case, and denoted $R_i$ for a test case, respectively. The test case is compared to the base case via dissimilarity measures between $Q_i$ and $R_i$. An (un)changing DF indicates (un)altered dynamics. The dynamical flow is determined between phase-space states, y(i)→y(i+1), as a connected phase-space vector, Y(i)=[y(i), y(i+1)], with corresponding DFs and dissimilarity measures that have the same form as the earlier phase-space measures. Several sequential occurrences of the dissimilarity measures above a threshold indicate significant change, as a forewarning of machine failure or a biomedical event. This approach also provides an indication of event onset. For further details of this methodology reference is made to U.S. Pat. Nos. 7,209,861; 7,139,677; 6,484,132; 6,460,012; 5,857,978; 5,815,413 and 5,626,145.

Knowledge discovery via the phase-space method is via dissimilarity between known and test cases for machine and biomedical applications. Examples include accelerated (A) failure and seeded (S) fault tests in motors and motor-driven components (no prediction failures) including:

Forewarning of gear failure (A) from torque, vibration, and motor power;

Forewarning of bearing failure (A) from vibration and motor power;

Imbalance and misalignment faults (S) in a motor-driven pump from electrical power;

Motor faults (air-gap offset, cut rotor, turn-to-turn short, imbalance) by vibration & electrical power (S);

Detection of a progressively larger crack (S) in rotating blade from vibration and electrical power;

Detection of progressively larger drill bit wear (A) from spindle-motor current;

Distinction between different states (S) for (un)balanced centrifugal pump from motor power;

Forewarning of structural failure (A) by cracking from time-serial stress and strain data.

The forewarning methodology has been incorporated in a low-cost, compact, personal digital assistant (PDA) prototype to forewarn the wearer and medical personnel of an epileptic seizure. The phase-space method provides the forewarning from EEG data. A second biomedical use is in the detection of breathing difficulty from surface chest sounds. Another is the sensing of surface heart waves to forewarn of ventricular fibrillation or fainting, and to detect sepsis onset.

Forewarning can be physically provided by providing an output of at least one of a graph, a table of data or an observable signal by which a human observer can detect the forewarning of a critical event.

Figure 3:
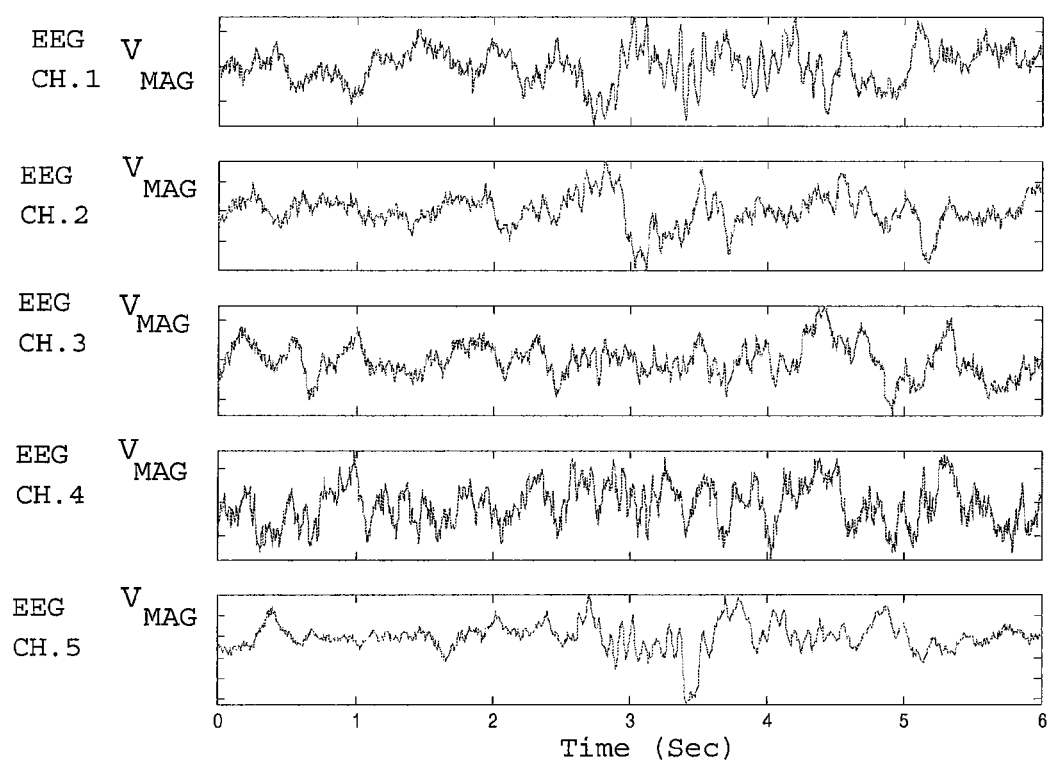
FIG. 3 is a diagram of five channels of brain wave data which can be an input to a system of the present invention.
Figure 4:
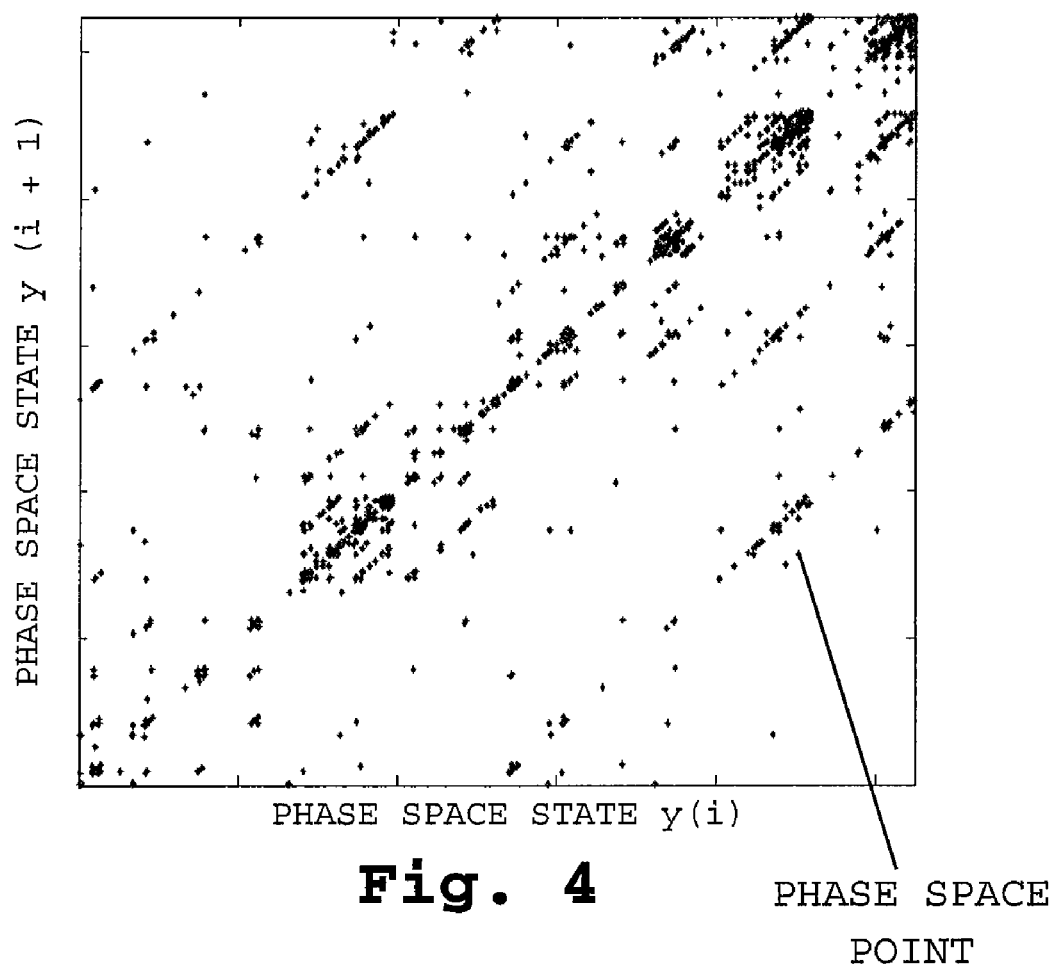
FIG. 4 is a graph of phase-space points developed from the data graphed in FIG. 3.
Figure 5:
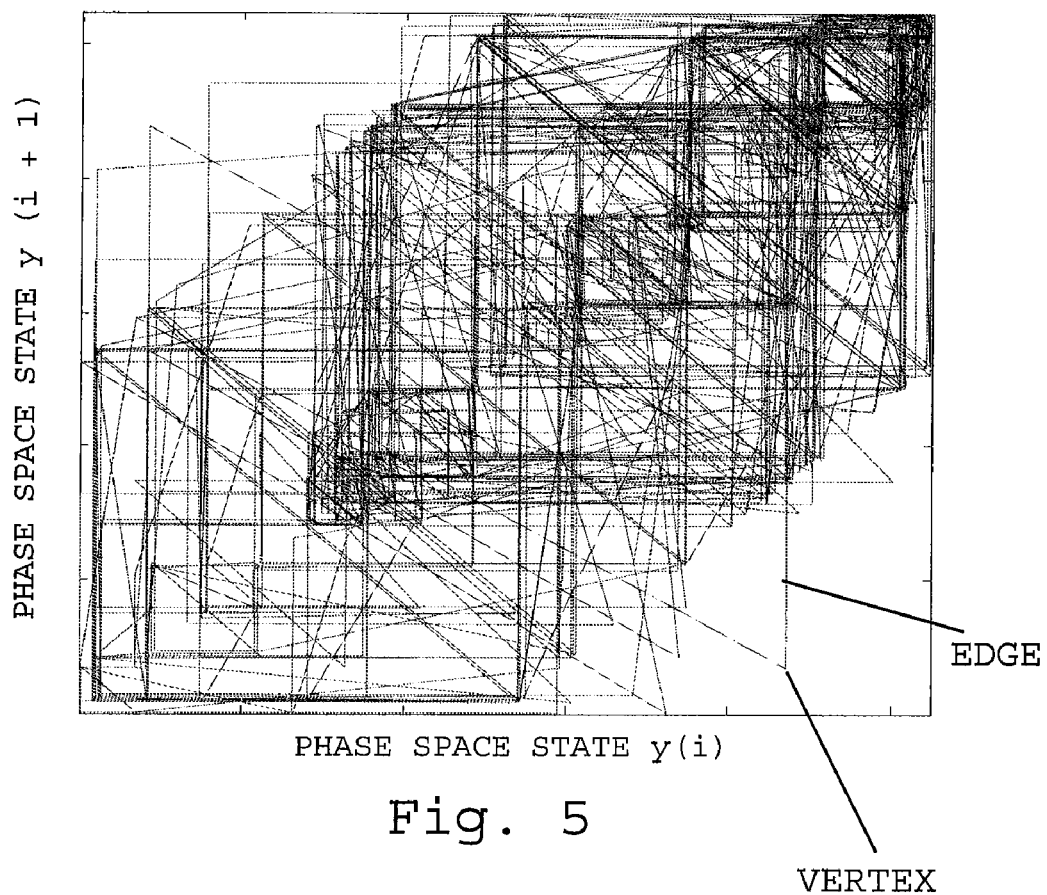
FIG. 5 is a graph of connectivity of these brain states (vertices or nodes) by lines (edges or links) in a complex, hierarchical network graph.

FIG. 3 shows 5 typical time-serial, bipolar channels, C1-C5, of brain wave data (electroencephalogram, EEG). FIG. 4 shows the result of conversion of 4,000 time-serial EEG data points across 18 bipolar EEG channels into 1,110 distinct, phase-space points, [y(i), y(i+1)] via FIG. 4 for d=1, C=18, S=2: $y(i)=\Sigma_k s(k)_i S^k$. FIG. 5 shows the time-serial connectivity of these brain states (vertices) by lines (edges), thus forming a very complex graph-theory network of information, as discussed above. This graph-based approach to knowledge discovery enables processing of great quantities of unrelated, partial, noisy data that are spread over time and space.

The present invention extends the phase-space method of the forewarning technology to general knowledge discovery, as follows. The discrete phase-space identifier, y(i), forms an irreducible representation (first item of Hawkins' paradigm). Transitions from one state to the next, y(i)→y(j), can also be represented uniquely by the connected phase-space vector, Y(i), thus providing auto-associativity (the second item of Hawkins' paradigm). The discrete phase-space states can be viewed as nodes, and the linkages can be viewed as edges in a network (directed graph in the mathematical sense) of relationships among items (ontology). Clusters of relationships in this network form the hierarchical structure that enables association of low-level features from data into higher-level features (third item of Hawkins' paradigm). Construction of the auto-associative feed-forward sequences, y(i)→y(j), enables higher-level inferences, as well as feed-back, y(j)→y(i), for self-consistent knowledge extraction (fourth item in Hawkins' paradigm). More generally, any item (e.g., phoneme, word, image feature) can be assigned a unique label, y(i), as an irreducible representation. The other features of the Hawkins' paradigm (auto-associativity, hierarchical structure, feed-forward/feed-back) follow naturally from the contextual item presentations (e.g., text sequence, image composition, speech flow). Consequently, graph-based knowledge discovery can handle any type of data.

The technical literature on knowledge discovery has a long and rich history. One class of feature extraction uses the occurrence frequency of the discrete states (items). The resultant "feature vector" is processed by a "vector machine" for knowledge discovery. A second class of classifiers includes links among the discrete states, as nodes that form the directed graph, or "feature graph," which is processed by a "graph machine" for knowledge discovery. Equations 1-3 stated above yield DFs from y(i) and Y(i), which are a form of feature vector and feature graph, respectively. In K. McGarry, "A survey of the interestingness measures of knowledge discovery," Knowledge Engr. Rev. 20 (March 2005), pp. 39-61, a survey of knowledge discovery representations is described as shown in Table 1. Different states are distinguished by means of one or more patterns, classifiers, or features. One working definition of "pattern" is as follows: "Given a set of facts (data) F, a language L, and some measure of certainty C, a statement S in L that describes relationships among a subset Fs of F with certainty C, such that S is simpler (in some sense) than the enumeration of all facts in FS." McGarry also notes that many data mining techniques (e.g., clustering) use (dis) similarity measures, such as those discussed above.

TABLE 1

Knowledge representation techniques in McGarry

| Technique | Data Types | Under-standable | Model |
|---|---|---|---|
| 1) Propositional rules | Categorical | Yes | classification |
| 2) First-order rules | Categorical | Yes | classification |
| 3) Association rules | Categorical | Yes | association/co-occurrence |
| 4) Decision trees | Categorical | Yes | classification |
| 5) Fuzzy logic | Continuous | Yes | classification |
| 6) Clustering | categorical, continuous | Yes | self-organizing |

TABLE 1-continued

Knowledge representation techniques in McGarry

| Technique | Data Types | Under-standable | Model |
|---|---|---|---|
| 7) Neural networks | Continuous | No | classification, self-organizing |
| 8) Bayesian networks | Categorical | Yes | classification |

An auto-associative memory is a sequence of states (e.g., IF . . . THEN logic) that form propositional rules (item 1 of Table 1) or if-then-logic rules (item 2 of Table 1). Such a sequence may (or may not) be part of a cluster, or may correspond to linkages from one cluster to another cluster in a hierarchy. The states in each cluster typically have many links among them that form association rules (item 3 in Table 1). Such multiple linkages are also equivalent to decision trees (item 4 of Table 1), fuzzy logic (item 5 in Table 1), and weighted or probabilistic decisions (items 7-8 in Table 1). Pattern recognition via clustering (item 6) typically involves the maximal common sub-graph, or characterization of strongly connected components. Consequently, the brain's hierarchical processing yields a complex network of decision relations and rules for intelligent knowledge discovery. The phase-space methodology provides a framework that encompasses all of these representations under the Hawkins' paradigm.

Table 2 shows typical measures for decision rules from McGarry. McGarry categorizes actionability as subjective, but later notes its objective measurability in terms of usefulness to the end user. Specific measures of usefulness include improvements in: analysis time, accuracy, identification of antecedent conditions, estimate of the action window in terms of the lifetime of the antecedent conditions, alternatives for action, anticipation of side-effects from those actions, changes in present practices, implementation cost, and cost avoidance. McGarry also categorizes interestingness as subjective, while subsequently noting its objective measurability in terms of predictability on the basis of existing knowledge. One aspect of predictability is the usual and expected (e.g., typical events (such as item sale rates) versus time of day, day of week, day of month, season, age/sex of purchaser), from which decisions are made about item re-order rates (for example). A second aspect involves the usual and unexpected (unanticipated combinations of usual events, e.g., sale of two dissimilar products to a demographic group of persons), from which a profitable marketing decision is placing the products near each other in a grocery store. A third aspect is the unusual and unexpected (combination of unusual events that precede an outlier/extreme/anomalous event). The change in outlier occurrence rate is one objective measure. Another is the prediction accuracy of outliers. More generally, the mutual information function (MIF) measures the average bits of information that can be inferred from one measurement about a second, and is a function of the time delay between the measurements. MIF was originally developed for any signal, and later applied to time-serial data.

TABLE 2

Approaches to interestingness measures in McGarry

| Technique | Reference | Type | Automatable |
|---|---|---|---|
| Not interesting | [Sahar 1999] | subjective | domain expert required |
| Thresholds | [Roddick 2001] | objective | some expertise required |
| Paradox detection | [Fabris 1999] | hybrid | some expertise required |
| Multi-criteria | [Freitas 1999] | objective | Yes |
| Bayesian | [Jaroszewicz 2004] | hybrid | domain expert required |
| Differential ratios | [Malone 2004] | objective | Yes |
| Complexity | | objective | yes: number of antecedents in rule |
| Consistency | | objective | yes: no contradiction among rules |
| Completeness | | objective | yes: fraction of cases covered |
| Correctness | | objective | yes: consistent with real world |
| Non-redundancy | | objective | yes: each rule ⇒unique outcome |
| Statistical confidence | | objective | yes: true positives and negatives |
| Statistical support | | objective | yes: total samples |
| Statistical outliers | (paradox, peculiarity) | objective | yes: number of exceptions |
| Actionability | | objective | yes: useful for decision/action |
| Interestingness | (unpredictability, surprise) | objective | yes: predictable from present info? |

Knowledge discovery begins with raw data (facts), and seeks information, which is something new or unknown from existing (or new) data. Knowledge is a shorter representation (fewer bits) than enumeration of the facts. Indeed, a simpler representation implies a better understanding. Our new paradigm for knowledge-discovery is a novel combination of Hawkins' paradigm, nonlinear dynamics (Eqs. 1-3), data mining (Table 1), and statistics (Table 2). The specific goals involve a technology that is: (1) automated, (2) understandable, (3) actionable, (4) computationally fast, (5) scalable to massive amounts of data, which are (6) disparate, incomplete, and noisy with (7) complex relationships, e.g., spatio-temporal relationships. The combination of these two methods has applications for homeland and national security, as well as biomedicine, finance, law, and business.

The invention can be implemented in many hardware and program environments, and across the full spectrum of typical hardware processors (e.g., smart sensor, desktop PC, high-performance server group, and high-performance vector/parallel super-computer). Any hardware platform currently used for artificial intelligence applications may be adapted with appropriate programming. Other types of processors that are developed for hierarchical memory-based processing can also be used.

The invention claimed is:

1. A method for simultaneously processing different categories of source data into informational data, and then processing different groups of informational data into knowledge-based data in a first computer or in a plurality of computers, the method comprising:
   acquiring a plurality of sets of source data within a first category of data for at least one test subject or process;
   processing the sets of source data within the first category utilizing a first occurrence of a first-tier computer program executing on a first computer in the first computer system to produce a first group of informational data;
   processing the sets of source data within a second category of data utilizing a second occurrence of a first-tier computer program executing on either the first computer or another computer in the first computer system to produce a second group of informational data;
   wherein the processing of the sets of source data within the first category and within the second category includes a non-linear statistical analysis of the source data further comprising computing at least two distribution functions from connected phase space data, computing at least one measure of dissimilarity between at least two of distribution functions, and comparing said measure of dissimilarity to a threshold for a number of occurrences to indicate a condition change in said measure of dissimilarity to provide a forewarning of a condition change;
   processing the first group and the second group of informational data with a second-tier computer program executing on either the first computer or another computer to produce knowledge-based data; and
   transmitting at least one of the source data, the informational data and the knowledge-based data from the first computer to a second computer having other source data, informational data or knowledge-based data for evaluation with the data from the first computer.

2. The method of claim 1, wherein the knowledge-based data provides a perceptible indication to a human observer of a forewarning of at least one of: a machine failure and a biomedical event.

3. The method of claim 1, wherein one category of source data relates to signals from a patient's brain, another category of source data relates to signals from a patient's heart, and a third category of source data relates to the patient's lungs.

4. The method of claim 1, wherein the first-tier computer program includes a program sequence for evaluating a group of source data and determining a probability of an occurrence of an event representing information based on said source data, and wherein said first-tier computer program provides an output with the informational data to the second-level computer program.

5. The method of claim 1, wherein the evaluation by the second computer system of the knowledge-based data from the first computer is carried out according to rules for a complex, hierarchical system modeled on a human brain.

6. The method of claim 5, wherein the rules are at least one of propositional rules, first-order rules, decision trees, fuzzy logic, clustering, neural networking rules or Bayesion networking rules.

7. The method of claim 1, wherein knowledge-based data is transmitted from the first computer to a second computer for evaluation with other knowledge-based data in the second computer.

8. The method of claim 1, wherein the first-tier computer program and the second-tier computer program are software agent programs.

9. The method of claim 1, wherein the knowledge-based data provides a forewarning of gear failure resulting from analysis of torque data, vibration data, and motor power data.

10. The method of claim 1, wherein the knowledge-based data provides a forewarning of bearing failure from vibration data and motor power data.

11. The method of claim 1, wherein the knowledge-based data provides a measure of imbalance and misalignment in a motor-driven pump from electrical power data.

12. The method of claim 1, wherein the knowledge-based data includes a detection of motor faults from vibration data and electrical power data.

13. The method of claim 1, wherein the knowledge-based data includes a detection of a progressively larger crack in a rotating blade from vibration data and electrical power data.

14. The method of claim 1, wherein the knowledge-based data include a detection of progressively larger drill bit wear from spindle-motor current data.

15. The method of claim 1, wherein the knowledge-based data include a detection of different states of balance and unbalance for a centrifugal pump from motor power data.

16. The method of claim 1, wherein the knowledge-based data include a forewarning indication of structural failure due to cracking from time-serial stress data and strain data.

17. A knowledge-based computer system for simultaneously processing different categories of source data into informational data, and then processing different groups of informational data into knowledge-based data, the computer comprising:
   a memory for storing a plurality of sets of source data within a first category of data for at least one test subject or process;
   a first occurrence of a first-tier computer program executing on a first computer in the system for processing the sets of source data within the first category utilizing executing on a first computer in the system to produce a first group of informational data;
   wherein the processing of the sets of source data includes a non-linear statistical analysis of the data further comprising computing at least two distribution functions from connected phase space source data, computing at least one measure of dissimilarity between at least two of distribution functions, and comparing said measure of dissimilarity to a threshold for a number of occurrences to indicate a condition change in said measure of dissimilarity to provide a forewarning of a condition change;
   a second occurrence of a first-tier computer program executing on either the first computer or another computer in the computer system for processing the sets of source data within a second category to produce a second group of informational data;
   a second-tier computer program executing on either the first computer or another computer for processing the first and second groups of information to produce knowledge-based data;
   a network communication device for transmitting at least one of the source data, the informational data and knowledge-based data from the first computer to a second computer having other source data, informational data or knowledge-based data for evaluation with the data from the first computer.

18. The system of claim 17, wherein the knowledge-based data provides a perceptible indication to a human observer of a forewarning of at least one of: a machine failure and a biomedical event.

19. The system of claim 17, wherein one category of source data relates to signals from a patient's brain, another category of source data relates to signals from a patient's heart, and a third category of source data relates to the patient's lungs.

20. The system of claim 17, wherein the first-tier computer program includes a program sequence for evaluating a group of source data and determining a probability of an occurrence of an event representing information based on said source data, and wherein said first-tier computer program provides an output with the information to the second-level computer program.

21. The system of claim 17, wherein the evaluation by the second computer system of the knowledge-based data from the first computer system is carried out according to rules for complex, hierarchical system modeled on a human brain.

22. The system of claim 17, wherein the rules are at least one of propositional rules, first-order rules, decision trees, fuzzy logic, clustering, neural networking rules or Bayesion networking rules.

23. The system of claim 17, wherein the first-tier computer program and the second-tier computer program are software agent programs.

* * * * *